United States Patent [19]

Ono et al.

[11] Patent Number: 4,864,082
[45] Date of Patent: Sep. 5, 1989

[54] BUNDLED STRANDS PROTECTOR

[75] Inventors: Mamoru Ono; Toshio Okazaki, both of Aichi, Japan

[73] Assignee: Yazaki Corporation, Tokyo, Japan

[21] Appl. No.: 201,902

[22] Filed: Jun. 3, 1988

[30] Foreign Application Priority Data

Jun. 9, 1987 [JP]  Japan ............................ 62-88017[U]

[51] Int. Cl.$^4$ .............................................. H02G 3/04
[52] U.S. Cl. ...................................... 174/97; 138/115; 174/101
[58] Field of Search ...................... 174/68.3, 72 A, 97, 174/101; 138/108, 115, 116, 117, 157, 162

[56] References Cited

U.S. PATENT DOCUMENTS 3,697,667 10/1972 Pollak et al. ................... 174/101 X
4,156,795  5/1979 Lacan ................................ 174/947

FOREIGN PATENT DOCUMENTS 0054456  6/1982 European Pat. Off. ............ 174/101
0106535  4/1984 European Pat. Off. .
 881995 11/1961 United Kingdom ................ 174/97
1009092 11/1965 United Kingdom ................ 174/97

Primary Examiner—Laramie E. Askin
Attorney, Agent, or Firm—Robbins & Laramie

[57] ABSTRACT

Disclosed is a bundled strands protector of a type of a U-shaped housing. The protector comprises a partition member upstanding from the bottom wall of the housing, a locking member provided on the free end of the partition member, and a retaining member hinged to one of the side walls of the housing and releasably engageable with the other side wall, the retaining member being provided with an engaging hole engageable with the locking member.

5 Claims, 4 Drawing Sheets

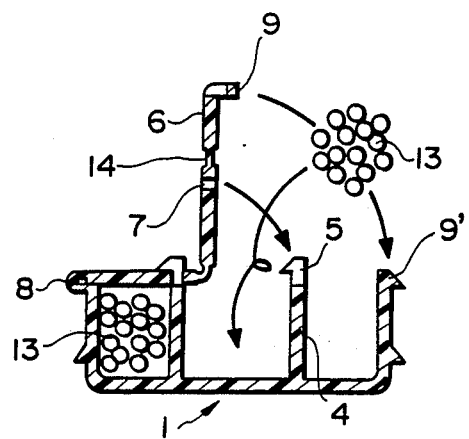
Fig. 5
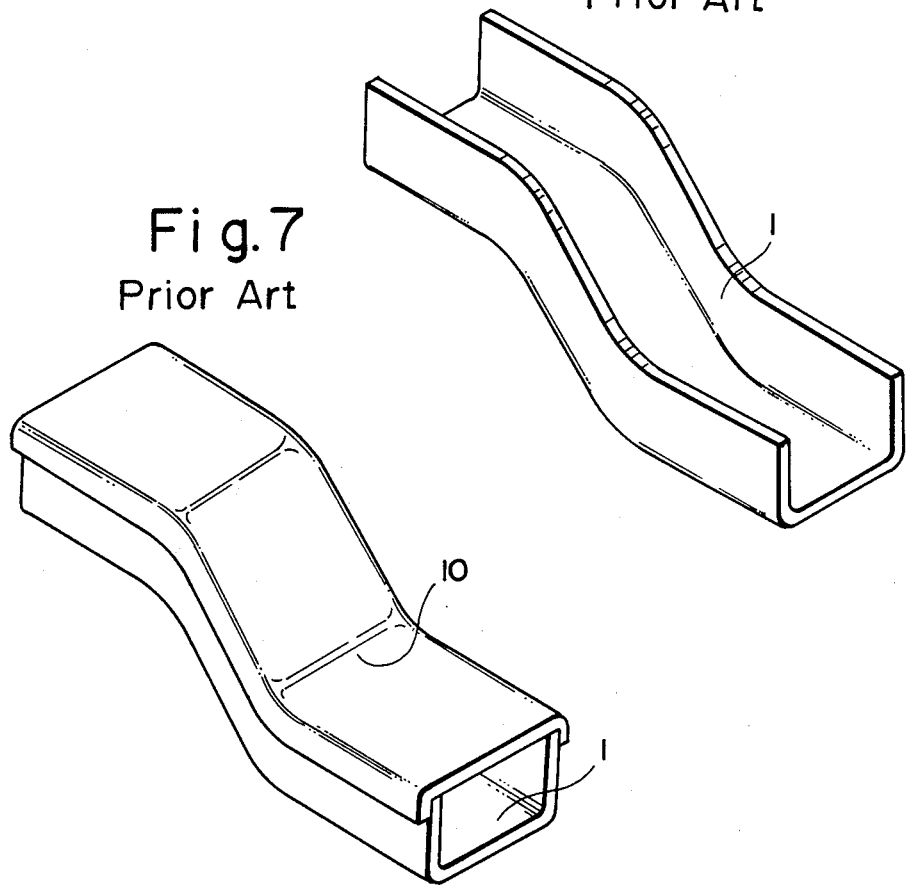
Fig. 6 Prior Art
Fig. 7 Prior Art

BUNDLED STRANDS PROTECTOR

BACKGROUND OF THE INVENTION

1. Field of the Invention

This invention relates to improvements in the structure of a protector used for protecting a bundle of many strands such as electric wires, wire harnesses or optical fiber cables from being damaged during wiring these strands.

2. Description of the Prior Art

A variety of kinds of electric equipment is now incorporated in an automobile, and an enormous number of strands such as electric wires are used for establishing wiring connections required for such electric equipment. The electric wires are suitably bundled and housed in a protector, so that they can be regularly arranged without being entangled and, after the step of wiring, they can be protected against damage which leads to disabling the associated electric equipment.

A prior art protector used for the purpose described above is composed of a housing in the form of a U-shaped channel member and a cover member covering the opening of the housing. After inserting a bundle of strands such as electric wires in the housing, the cover member closes the opening of the housing to protect the bundle of electric wires received in the housing.

However, because of a three-dimensionally curved structure of the protector, the bundle of the strands such as the electric wires having a high rigidity could not follow up the curved configuration of the protector and tended to float upward from the bottom wall of the housing of the protector, to concentrate in a part of the protector housing or to partly protrude to the exterior from the protector housing. For the reasons described above, the prior art protector has been defective in that difficulty is encountered for successfully mounting the cover member on the housing of the protector.

SUMMARY OF THE INVENTION

With a view to obviate the prior art defect pointed out above, it is an object of the present invention to provide an improved protector for protecting a bundle of strands such as electric wires received in its housing, in which the bundle of the strands such as the electric wires can be housed to follow up a three-dimensional curvature of the housing so as to prevent undesirable floating or external protrusion of the electric wires from the housing.

In accordance with the present invention which attains the above object, there is provided a bundled strands protector of a type composed of a housing in the form of a U-shaped channel member having a bottom wall and a pair of side walls upstanding from the longitudinal sides of the bottom wall, the protector comprising partition members upstanding from the bottom wall and disposed intermittently at predetermined locations along the U-shaped channel member, a locking member provided on the free end of each partition member, and a retaining member having engaging means on at least one end thereof so as to be releasably engageable with the side walls of the U-shaped channel member, the retaining member being provided with engaging holes engageable with the locking members.

The above and other objects, features and advantages of the present invention will become clear from the following description of the preferred embodiment when the same is read in conjunction with the accompanying drawings.

BRIEF DESCRIPTION OF THE DRAWINGS

FIG. 5 is a sectional view taken along the line 5—5 in FIG. 3.

FIG. 6 is a perspective view of a housing of a prior art protector.

FIG. 7 is a perspective view to show a cover member mounted on the housing shown in FIG. 6.

DESCRIPTION OF THE PREFERRED EMBODIMENTS

A preferred embodiment of the protector according to the present invention will now be described with reference to FIGS. 1 to 5.

Figure 1:
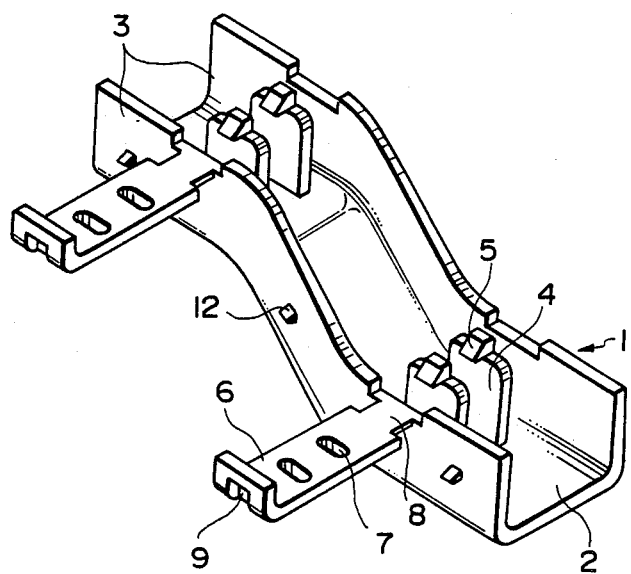
FIG. 1 is a perspective view of an embodiment of the protector according to the present invention to show the internal structure of its housing.

Referring to FIG. 1, an embodiment of the protector of the present invention comprises a housing 1 in the form of a U-shaped channel member having a bottom wall 2 and a pair of side walls 3 upstanding from the longitudinal sides of the bottom wall 2. The protector is preferably made of resilient thermoplastic material such as polypropylene. As shown in FIG. 1, the housing 1 has a three-dimensionally curved configuration. A plurality of pairs of spaced partition members 4 upstand from the bottom wall 2 in a relation generally parallel to the side walls, thereby partitioning the internal space of the housing 1 into a plurality of spaces as shown in FIG. 5. The length of the partition members 4 in the longitudinal direction of the housing 1 is freely selected. That is, this length of the partition members 4 is determined depending on the relation between the force imparted from bundles of strands such as electric wires received in the partitioned internal space of the housing 1 and the manufacturing costs including the material cost. The partition members 4 may be in the form of short bars.

A locking member 5 is provided on the free end of each of the partition members 4. This locking member 5 is inserted in a corresponding engaging hole 7 of a retaining member 6 which will be described below.

Retaining members 6 are shown in FIG. 1 by way of example. Each of the retaining members 6 is connected at one end thereof to one of the side walls 3 by a hinge 8 and has an engaging means 9 at the other end thereof to engage the other side wall 3. Each retaining member 6 is provided with, for example, engaging holes 7 each of which as a snap engaged by the associated locking member 5 provided on the corresponding partition member 4. When the retaining members 6 are hinged to one of the side walls 3 of the housing 1 as shown in FIG. 1, they can be molded together with the housing 1. However, the retaining members 6 may be molded separately from the housing 1, and the engaging means 9 may be provided on both ends of each of the retaining members 6 for engagement with the side walls 3 of the housing 1.

Figure 2:
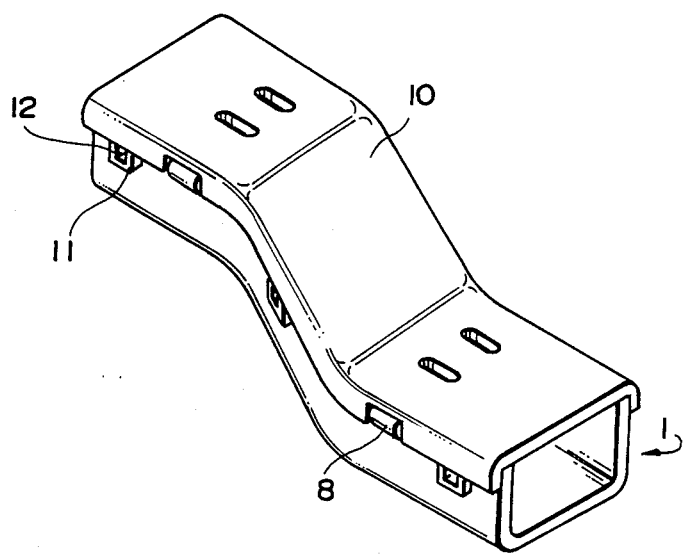
FIG. 2 is a perspective view to show a cover member mounted on the housing shown in FIG. 1.

Referring to FIG. 2, a cover member 10 has a plurality of engaging means 11 which are engaged by a plurality of corresponding engaging lugs 12 provided on the illustrated side wall 3 of the housing 1. Engagement between the cover member 10 and the non-illustrated side wall 3 of the housing 1 is similar to that described above. The cover member 10 may be hinged to the housing 1. Although the cover member 10 is effective for the protection of the bundles of strands received in the housing 1, it is not necessarily essentially required and may be unnecessary depending on the circumference where the protector is used.

Figure 3:
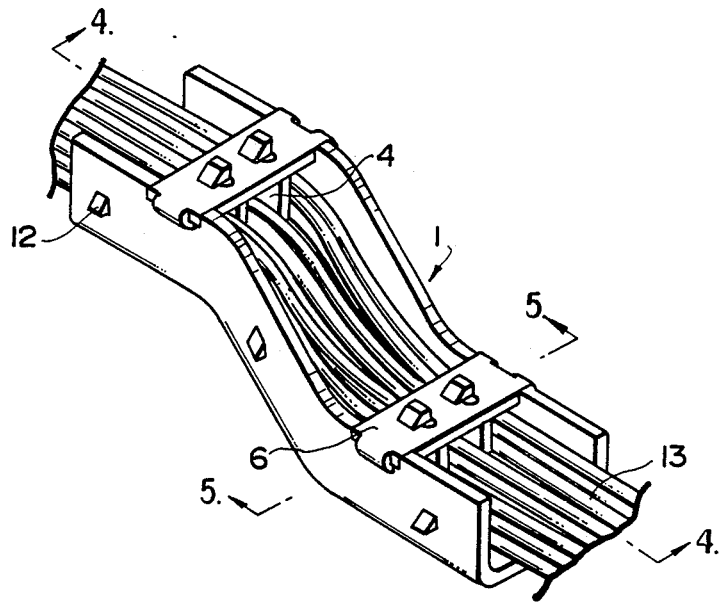
FIG. 3 is a perspective view to show the protector of the present invention in use.
Figure 4:
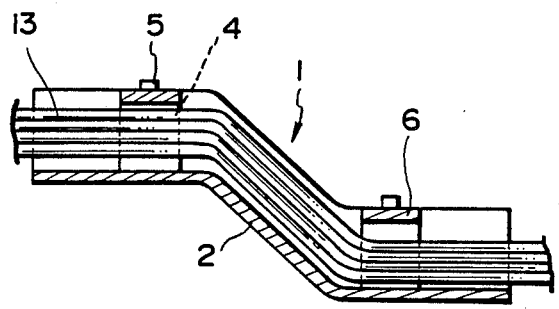
FIG. 4 is a sectional view taken along the line 4—4 in FIG. 3.
Figure 8:
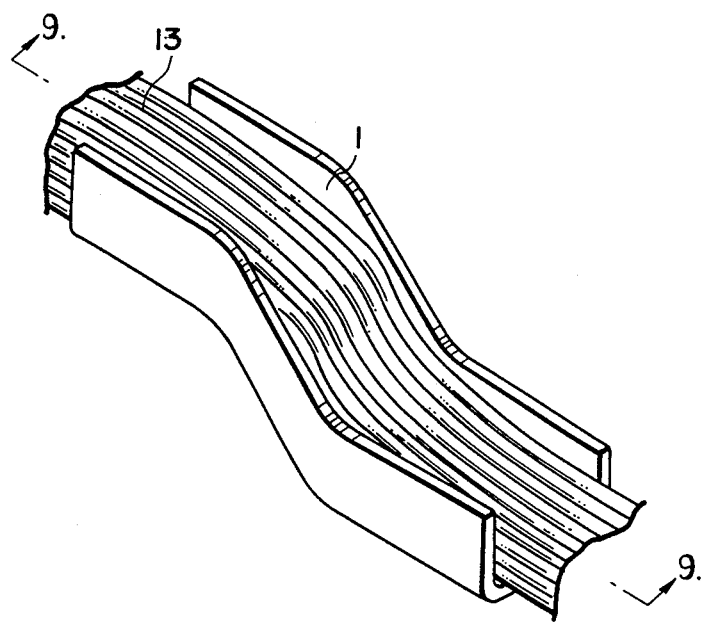
FIG. 8 is a perspective view to show the prior art protector in use, with the cover member being removed.
Figure 9:
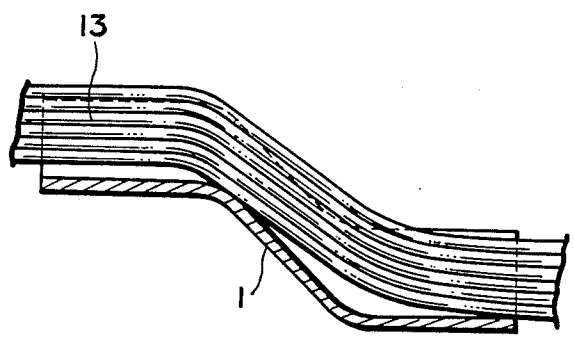
FIG. 9 is a sectional view taken along the line 9—9 in FIG. 8.

How to use the protector will be described with reference to FIGS. 3, 4 and 5. As shown in FIG. 5, a large bundle of strands 13 divided into small bundles of strands 13, and each of the small bundles of strands 13 is inserted into each of the spaces partitioned by the partition members 4. By the provision of the partition members 4, the bundles of strands 13 can be unifomly laid in the housing 1 without being locally concentrated. After the insertion of the strand bundles 13 in the housing 1, each of the retaining members 6 is urged toward the corresponding pair of partition members 4 until the locking members 5 provided on the free ends of the partition members 4 fit into and engage the associated engaging holes 7 of the retaining member 6 so as to retain the strand bundles 13 in the internal space of the protector housing 1, that is, to prevent external protrusion of the strand bundles 13. The retaining work is facilitated when hinges 14 are provided in each retaining member 6 at positions near the associated partition members 4 as shown in FIG. 5. After the strand bundles 13 are completely laid in the protector housing 1, the engaging means 9 of each of the retaining members 6 is engaged by an associated engaging lug 9' provided on the other side wall 3. Thus, the retaining members 6 are fixed to the protector housing 1 as shown in FIG. 3.

Each of the small strand bundles 13 has a low rigidity. Therefore, each strand bundle 13 can exactly extend along the curvature of the protector housing 1 without floating upward from the bottom wall 2 of the protector housing 1 as shown in FIG. 4.

The retaining members 6 can effectively retain the strand bundles 13 in the protector housing 1 when they are disposed at positions where the protector housing 1 is curved. The procedure for laying the strand bundles 13 in the protector is completed when the cover member 10 shown in FIG. 2 is mounted on the housing 1 in the state shown in FIG. 3.

It will be understood from the foregoing description of the present invention that a large bundle of strands is inserted into a three-dimensionally curved housing of a protector in the form divided into a plurality of small bundles of strands by partition members, so that the strands can be housed in the protector housing in a relation curved along the curvature of the protector housing. Therefore, no floating of the strands occurs thereby facilitating the mounting of a cover member on the protector housing, and no external protrusion of the strands from the protector housing improves the efficiency of the strand wiring work.

What is claimed is:

1. A bundled strands protector, comprising a housing in the form of a generally non-planar U-shaped channel member having a bottom wall and a pair of side walls upstanding from the longitudinal sides of the bottom wall, a plurality of partition members integrally formed with said bottom wall and extending generally transversely therefrom, said partition members being substantially rigid and disposed intermittently at predetermined locations along said U-shaped channel member, a locking member provided on the free end of each of said partition members, and a plurality of retaining members having engaging means on at least one end thereof so as to be releasably engageable with the side walls of said U-shaped shaped channel member, each of said retaining members being provided with at least one engaging hole engageable with said locking members.

2. A bundled strands protector according to claim 1, wherein each said retaining member is connected at one end thereof to one of said side walls by a hinge, and said engaging means being provided at the other end thereof to engage with the other of said side walls.

3. A bundled strands protector according to claim 1, wherein each of said retaining members is provided with said engaging means at both ends thereof to engage with said side walls.

4. A bundled strands protector according to claim 1, wherein each engaging hole of each retaining member can be snap-engaged with a respective locking member.

5. A bundled strands protector according to claim 1, wherein said plurality of partition members are arranged to form at least one column extending longitudinally along said U-shaped channel member.

* * * * *